US010116810B2

(12) United States Patent
Miyazawa

(10) Patent No.: US 10,116,810 B2
(45) Date of Patent: Oct. 30, 2018

(54) IMAGE-OUTPUTTING APPARATUS FOR OUTPUTTING NOTIFICATION IMAGE SENT FROM SERVER

(71) Applicant: BROTHER KOGYO KABUSHIKI KAISHA, Nagoya, Aichi (JP)

(72) Inventor: Masafumi Miyazawa, Nagoya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 15/940,303

(22) Filed: Mar. 29, 2018

(65) Prior Publication Data

US 2018/0227441 A1 Aug. 9, 2018

Related U.S. Application Data

(62) Division of application No. 15/070,426, filed on Mar. 15, 2016, now Pat. No. 9,992,356.

(30) Foreign Application Priority Data

Mar. 30, 2015 (JP) .................. 2015-070416

(51) Int. Cl.
*G06F 3/12* (2006.01)
*H04N 1/00* (2006.01)
*G06F 15/16* (2006.01)

(52) U.S. Cl.
CPC ..... *H04N 1/00114* (2013.01); *H04N 1/00212* (2013.01); *H04N 1/00244* (2013.01); *H04N 1/00411* (2013.01); *H04N 2201/0094* (2013.01)

(58) Field of Classification Search
CPC ........... H04N 1/00114; H04N 1/00212; H04N 1/00244; H04N 1/00411;
(Continued)

(56) References Cited

U.S. PATENT DOCUMENTS 8,554,837 B2* 10/2013 Davi .................. G06F 17/3089
709/204
9,813,581 B2* 11/2017 Hakozaki ........... H04N 1/32507
(Continued)

FOREIGN PATENT DOCUMENTS

JP 2001-347734 A 12/2001

OTHER PUBLICATIONS

Office Action dated May 31, 2017 from parent U.S. Appl. No. 15/070,426.
(Continued)

*Primary Examiner* — Gabriel Garcia
(74) *Attorney, Agent, or Firm* — Scully, Scott, Murphy & Presser, PC

(57) ABSTRACT

A server including a network interface, a storage and a controller. The network interface communicates with an image-outputting apparatus. The storage is capable of storing the notification data for transmission to the image-outputting apparatus. The controller receives the query information via the network interface, determines whether or not the notification data is stored in the storage in response to receiving the query information and receives the device information via the network interface in response to determining that the notification data is stored in the storage. The controller determines whether or not the login information included in the device information indicates a specific account. The controller transmits an output instruction to the image-outputting apparatus in response to determining that the login information indicates the specific account, the output instruction being for controlling the image-outputting apparatus to output a notification image represented by the notification data.

5 Claims, 13 Drawing Sheets

(58) Field of Classification Search
CPC .......... H04N 2201/0094; G06Q 10/107; G06F 3/1204; G06F 3/1218; G06F 3/1222
USPC ......... 358/1.1–1.18, 402, 448, 474; 709/201, 709/203, 208, 223, 229
See application file for complete search history.

(56) References Cited

U.S. PATENT DOCUMENTS

| | | | |
|---|---|---|---|
| 9,912,736 B2 * | 3/2018 | Allen | H04L 67/10 |
| 9,992,356 B2 * | 6/2018 | Miyazawa | H04N 1/00114 |
| 2007/0047006 A1 | 3/2007 | Sakai | |
| 2013/0070288 A1 | 3/2013 | Muranaka | |
| 2013/0077125 A1 | 3/2013 | Kitagata | |
| 2015/0070719 A1 | 3/2015 | Kuribara | |

OTHER PUBLICATIONS

Office Action dated Dec. 28, 2017 from parent U.S. Appl. No. 15/070,426.
Notice of Allowance dated Feb. 9, 2018 from parent U.S. Appl. No. 15/070,426.

* cited by examiner

FIG. 3A

| USER ID | PASSWORD | ACCOUNT TYPE |
|---------|----------|--------------|
| USER A  | 123      | Admin        |
| USER A  | 456      | User         |
| ⋮       | ⋮        | ⋮            |

FIG. 3B

| CONTACT INFORMATION | admin@xxx.yy.zz |
|---------------------|------------------|

FIG. 4A

| PRINTER ID | NOTIFICATION DATA |
|---|---|
| MFP-A | COUPON DATA |
| MFP-B | UPDATE NOTIFICATION DATA |
| ...... | ...... |

FIG. 4B

| PRINTER ID | CONSENT FLAG |
|---|---|
| MFP-A | PERMISSION GRANTED |
| MFP-B | PERMISSION GRANTED |
| MFP-C | PERMISSION NOT GRANTED |
| ...... | ...... |

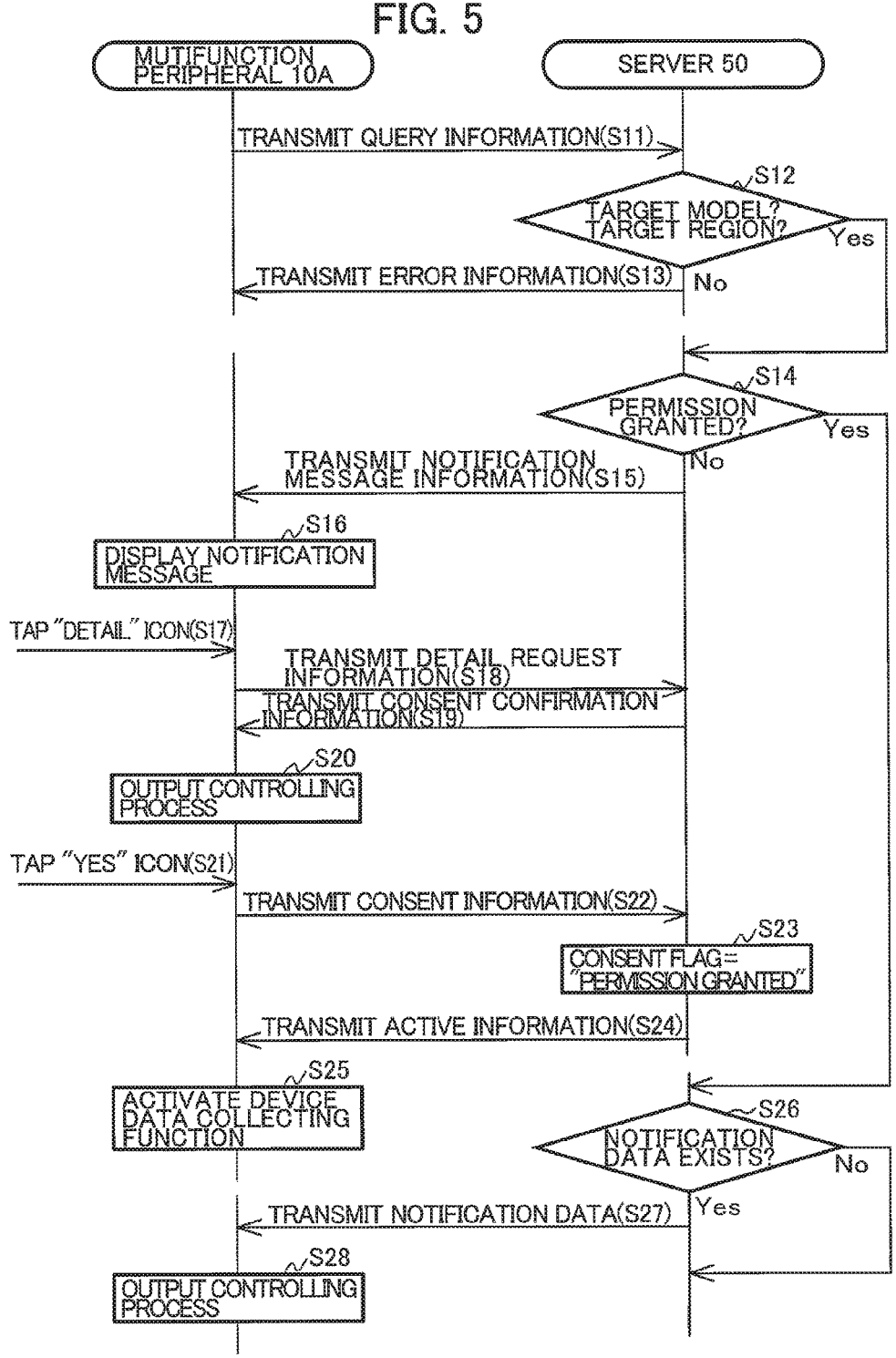

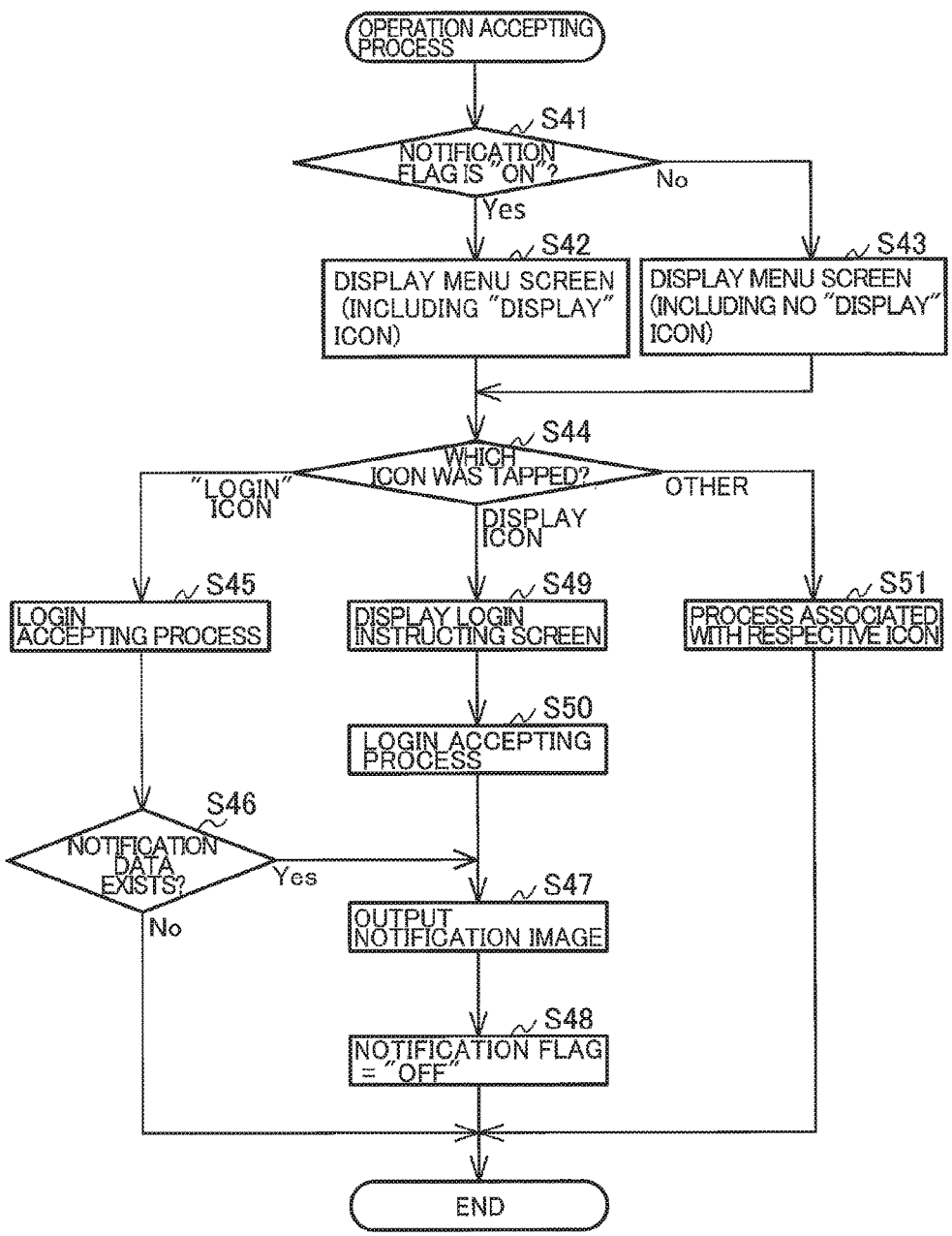

IMAGE-OUTPUTTING APPARATUS FOR OUTPUTTING NOTIFICATION IMAGE SENT FROM SERVER

CROSS REFERENCE TO RELATED APPLICATION

This application is a divisional application of U.S. Ser. No. 15/070,426 filed on Mar. 15, 2016 and claims priority from Japanese Patent Application No. 2015-070416 filed Mar. 30, 2015. The entire contents of each of which are incorporated herein by reference.

TECHNICAL FIELD

The present disclosure relates to an image-outputting apparatus for outputting an image specified by data from a server.

BACKGROUND

A conventional server known in the art collects device data from a printer and transmits to the printer notifications generated based on the collected device data. For example, in a system described in Japanese Patent Application Publication No. 2001-347734, the server acquires an accumulated value of ink usage from the printer. The server sends an image of a coupon based on the accumulated usage, and controls the printer to print the image of the coupon.

SUMMARY

However, when the printer is shared by a plurality of users, the conventional system having the above configuration cannot easily send notifications to specific users. One typical example is when the server has a notification printed on a sheet for the administrator of the printer, but the printed notification is taken by another user and is never received by the administrator.

In view of the foregoing, it is an object of the present disclosure to provide a an image-outputting apparatus capable of outputting a notification received from a server at a suitable timing.

In order to attain the above and other objects, the disclosure provides an image-outputting apparatus including a network interface, an output unit configured to output images, a user interface configured to receive user operations, and a controller. The controller is configured to (a) determine whether or not a login operation is accepted via the user interface, the login operation being performed by a user to which an account is assigned. The controller is configured to determine what type of machine operation is permitted for the logged user on the basis of the account used for the accepted login operation. The controller is configured to receive notification data from a server via the network interface, the notification data containing information to be transmitted to an authorized user to whom a specific account is assigned. The controller is configured to (b) determine whether or not an authorized user is logged in in response to receiving notification data from the server. The controller is configured to (c) control the output unit to output a notification image represented by the notification data in response to determining in (b) that the authorized user is logged in. The controller is configured to (d) store the notification data in the storage in response to determining in (b) that the authorized user is not logged in.

According to another aspect, the disclosure provides a server including a network interface, a storage, and a controller. The network interface is configured to communicate with an image-outputting apparatus, the image-outputting apparatus being configured to receive user operations including a login operation, the login operation being performed by a user to which an account is assigned, the image-outputting apparatus being configured to determine whether or not the login operation is accepted, the image-outputting apparatus being configured to determine what type of machine operation is permitted for the logged user on the basis of the account used for the accepted login operation, the image-outputting apparatus being configured to transmit query information and device information to the server, the query information being for querying the server whether notification data to be transmitted to the image-outputting apparatus exists, the device information including a login information indicating the account used by the user logged in to the image-outputting apparatus. The storage is capable of storing the notification data for transmission to the image-outputting apparatus. The controller is configured to receive the query information via the network interface. The controller is configured to (a) determine whether or not the notification data is stored in the storage in response to receiving the query information. The controller is configured to receive the device information via the network interface in response to determining in (a) that the notification data is stored in the storage. The controller is configured to (b) determine whether or not the login information included in the device information indicates a specific account, the specific account being assigned to an authorized user. The controller is configured to (c) transmit an output instruction to the image-outputting apparatus via the network interface in response to determining in (b) that the login information included in the device information indicates the specific account, the output instruction being for controlling the image-outputting apparatus to output a notification image represented by the notification data.

According to still another aspects, the disclosure provides an image-outputting apparatus including a network interface, an output unit configured to output images, a storage capable of storing contact information indicating a notification destination to which information about a state of the output unit is transmitted, and a controller. The controller is configured to receive notification data from a server via the network interface. The controller is configured to (a) determine whether or not the contact information is stored in the storage. The controller is configured to (b) transmit the notification data to the notification destination via the network interface in response to determining in (a) that the contact information is stored in the storage. The controller is configured to control the output unit to output a notification image represented by the notification data in response to determining in (a) that the contact information is not stored in the storage.

According to still another aspect, the disclosure provides a server including a network interface, a storage, and a controller. The network interface is configured to communicate with an image-outputting apparatus, the image-outputting apparatus comprising a output unit configured to output images, the image-outputting apparatus being configured to transmit query information and contact information to the server, the query information being for querying the server whether notification data to be transmitted to the image-outputting apparatus exists, the contact information indicating a notification destination to which information about a state of the output unit is transmitted. The storage is capable of storing notification data. The controller is configured to receive the query information from the image-outputting apparatus via the network interface. The controller is configured to (a) determine whether or not the notification data is stored in the storage in response to receiving the query information. The controller is configured to transmit transmission request information to the image-outputting apparatus via the network interface in response to determining in (a) that the notification data is stored in the storage, the transmission request information being for requesting the image-outputting apparatus for transmitting the contact information. The controller is configured to transmit the notification data to the notification destination via the network interface when the contact information is received from the image-outputting apparatus via the network interface. The controller is configured to transmit an output instruction to the image-outputting apparatus via the network interface when the contact information is not received from the image-outputting apparatus via the network interface, the output instruction being for controlling the output unit to output a notification image represented by the notification data.

BRIEF DESCRIPTION OF THE DRAWINGS

The particular features and advantages of the disclosure as well as other objects will become apparent from the following description taken in connection with the accompanying drawings, in which:

FIG. 3A is an explanatory diagram illustrating account information stored in a data storage area of the multifunction peripheral;

FIG. 3B is an explanatory diagram illustrating contact information stored in the data storage area of the multifunction peripheral;

FIG. 4A is an explanatory diagram illustrating notification data associated with respective printer IDs stored in a data storage area of the server;

FIG. 4B is an explanatory diagram illustrating consent flags associated with respective printer IDs stored in a data storage area of the server;

FIG. 5 is a flowchart illustrating processes performed in the recording system according to the first embodiment.

FIG. 7 is a flowchart illustrating an operation accepting process;

FIG. 10A is an explanatory diagram illustrating the menu screen when a notification flag is set to ON;

DETAILED DESCRIPTION

Figure 1:
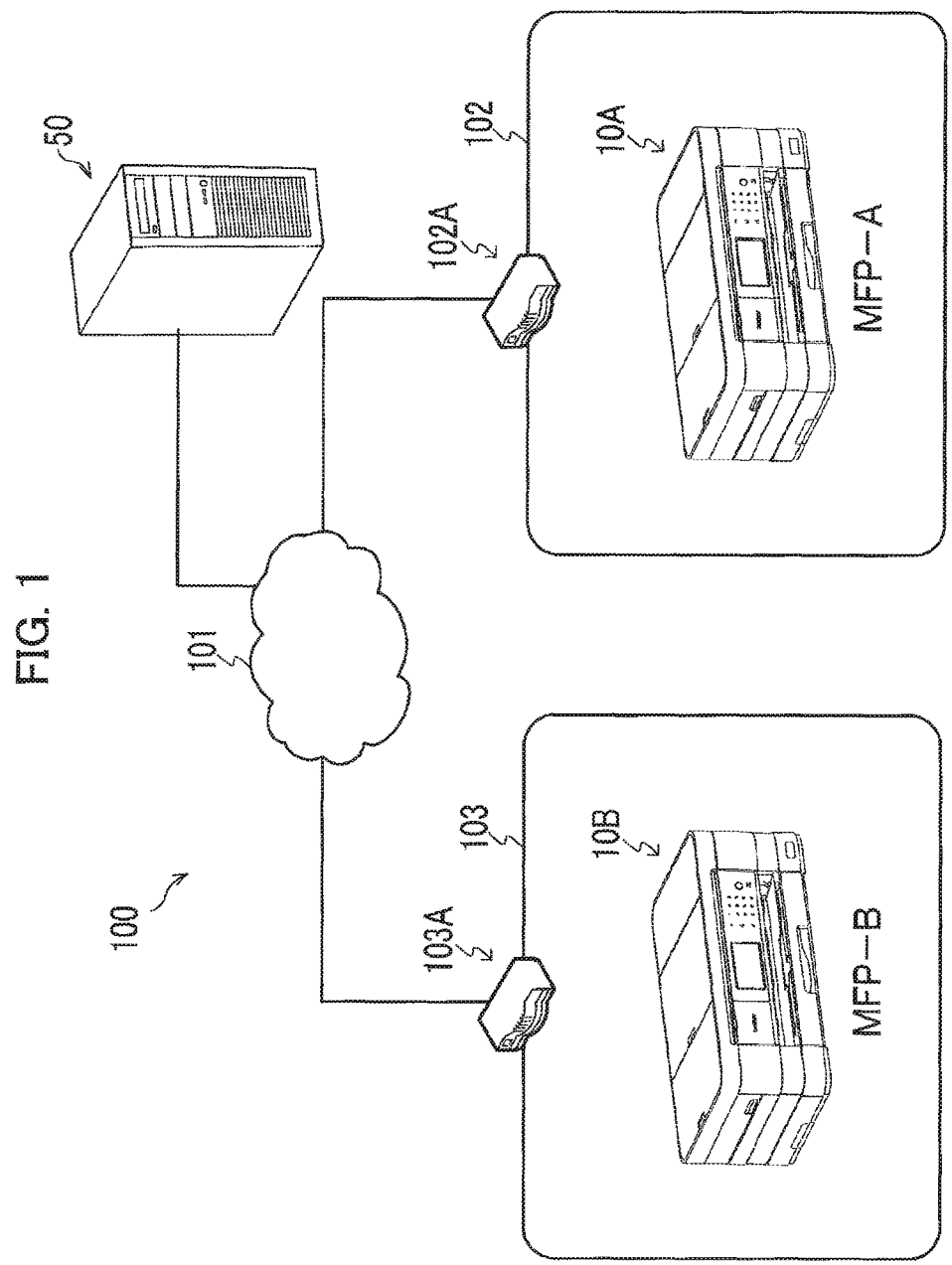
FIG. 1 is a schematic diagram illustrating a recording system according to a first embodiment.

An image-outputting apparatus according to embodiments will be described while referring to the accompanying drawings wherein like parts and components are designated by the same reference numerals to avoid duplicating description. It would be apparent to those skilled in the art that various changes and modifications may be made therein without departing from the scope of the disclosure. Further, any components and processes described in following first and second embodiments can arbitrary combined.

First Embodiment

FIG. 1 is a schematic diagram illustrating a recording system 100 according to a first embodiment of the present disclosure. The recording system 100 illustrated in FIG. 1 includes two multifunction peripherals 10A and 10B (hereinafter also collectively referred to as "multifunction peripherals 10"), and a server 50. The multifunction peripherals 10 and server 50 can communicate with each other over a communication network. While there are no particular limitations on the structure of the communication network, the communication network may be the Internet, a wired local area network (LAN), a wireless LAN, or a combination of these.

As illustrated in FIG. 1, the multifunction peripheral 10A resides on a LAN 102, while the multifunction peripheral 10B resides on a LAN 103. The LANs 102 and 103 are further connected to the Internet 101 via routers 102A and 103A, respectively. The server 50 is also connected to the Internet 101. Thus, the multifunction peripherals 10A and 10B can communicate with the server 50 on the Internet 101 via the routers 102A and 103A. Hence, when the multifunction peripherals 10A and 10B transmit IP packets to the server 50, the source address (SA) in the IP packet is set to the global IP address assigned to the corresponding routers 102A and 103A.

<Multifunction Peripherals 10>

Figure 2A:
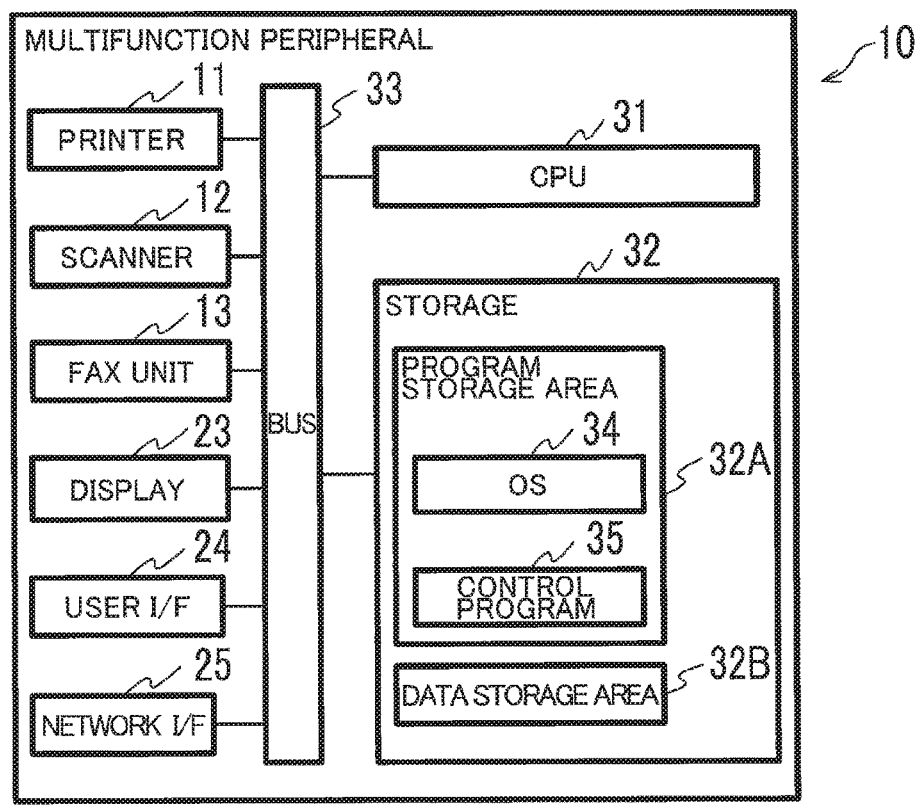
FIG. 2A is a block diagram illustrating an electrical configuration of a multifunction peripheral according to the first embodiment.

As illustrated in FIG. 2A, each multifunction peripheral 10 includes a printer 11, a scanner 12, a fax unit 13, a display 23, a user interface 24 (hereinafter referred to as "user I/F 24"), a network interface 25 (hereinafter referred to as "network I/F 25"), a CPU 31, and a storage 32, all of which are connected to each other via a communication bus 33. The multifunction peripheral 10 is an example of an image-outputting apparatus. The printer 11 is an example of an output unit. The fax unit 13 is an example of an output unit. The display 23 is example of an output unit. Note that the multifunction peripherals 10A and 10B have common configurations.

<Printer 11, Scanner 12, and Fax Unit 13>

The printer 11 executes a recording process to record an image specified by image data on a sheet. The method of recording employed by the printer 11 may be any well-known method, including an inkjet method and electrophotographic method. The scanner 12 executes a scanning process to read an image recorded on a sheet and to generate image data. The fax unit 13 executes a fax process for transmitting and receiving fax data in a method conforming to a fax protocol. The multifunction peripherals 10 may also execute a copying process for reading an image recorded on a sheet and recording this image on another sheet. The printer 11 is an example of a recorder.

<Display 23>

The display 23 includes a display screen for displaying various information. The display 23 may be configured of a liquid crystal display (LCD) or an organic electro-luminescence display (organic EL display), for example.

<User I/F 24>

The user I/F 24 receives operations from the user when the user selects objects displayed on the display screen of the display 23. More specifically, the user I/F 24 has buttons and outputs various operating signals corresponding to buttons that have been pressed to the CPU 31. The user I/F 24 may also include a film-like touch sensor laid over the display screen of the display 23. In other words, the display 23 may be configured as a touchscreen display. The user I/F 24 is an example of the receiving unit in the disclosure.

Note that the term "object" used in this description denotes an image that the user can select by operating the user I/F 24. An example of an object is a character string displayed on the display 23. The user may highlight an object by pressing directional keys on the user I/F 24 and may select the highlighted object by pressing a "Select" button the user I/F 24. Other examples of objects when the user I/F 24 is configured as a touchscreen are icons, buttons, and links displayed on the display 23. The user may select an object displayed by touching the touchscreen at the object's displayed position.

The user I/F 24 in the first embodiment is implemented as a touchscreen that receives operations in the form of the user touching the display screen of the display 23. The user I/F 24 outputs position information indicating positions on the display screen that the user touched. The position information can be expressed as coordinates (x, y) in an xy plane, where the upper left corner of the display screen serves as the point of origin, the positive X-axis extends rightward from the origin, and the positive Y-axis extends downward from the origin. The touch sensors of the user I/F 24 may be configured using any well-known method, including an electrostatic capacitive method or an resistive film method.

Note that the term "touch" in this specification in general includes any operation for contacting the display screen with an input medium. Examples of touching include a tap operation in which the touching input medium is separated from the display screen within a prescribed time; a long touch operation in which the touching input medium remains static on the display screen; a slide operation in which the input medium is slid over the display screen; a flick operating in which the input medium is slid over the display screen at an acceleration exceeding a threshold; a pinch-in operation in which two input media touching different positions on the display screen are slid closer to each other; and a pinch-out operation in which two input media touching different positions on the display screen are slid away from each other.

Further, the action of bringing the input medium to a position only slightly separated from the display screen while not touching the same may also fall under the concept of "touch" described above. Further, the input medium may be the user's finger or a stylus.

<Network I/F 25>

The network I/F 25 is an interface for communicating with external devices via the communication network. For example, the multifunction peripheral 10 can output various information to the server 50 via the network I/F 25, and can receive various data or various information from the server 50 via the network I/F 25. While there is no particular restriction on the specific communication method used in the network I/F 25, the network I/F 25 may employ Wi-Fi technology (Wi-Fi is a registered trademark of the Wi-Fi Alliance), for example.

<CPU 31>

The CPU (central processing unit) 31 functions to control the entire operations of the multifunction peripheral 10. The CPU 31 acquires various programs described later from the storage 32 and executes the programs. By executing the various programs, the CPU 31 implements various processes on the basis of various information outputted from the user I/F 24 and various information acquired from external devices via the network I/F 25. The CPU 31 and storage 32 constitute an example of the control unit in the disclosure.

<Storage 32>

The storage 32 has a program storage area 32A, and a data storage area 32B. The program storage area 32A stores an operating system (OS) 34, and a control program 35. The control program 35 may be a single program or an aggregate of programs. The data storage area 32B stores data or information required to execute the control program 35.

Note that the terms "data" and "information" used in this specification share aspects of being bits or bit strings that computers can handle. The computer treats "data" without considering the significance of its individual bits. In the case of "information," on the other hand, the computer's operations branch on the basis of the significance of the individual bits. Additionally, a "instruction" is a control signal prompting the destination device to perform the next operation. A instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and treated as information on another. Further, information may be extracted from data, and data may be extracted from information.

For example, the storage 32 is configured of random access memory (RAM), read-only memory (ROM), electrically erasable programmable read-only memory (EEPROM), a hard disk drive (HDD), a buffer provided in the CPU 31, or a combination of these.

Note that the storage 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The CPU 31 executes programs stored in the program storage area 32A. However, descriptions in this specification may omit the CPU 31 when describing operations of the programs. In other words, the phrasing "Program A executes Process A" in the following description may be used to signify that "the CPU 31 executes Process A described in Program A." The same holds true for programs executed on the server 50 described later.

The programs stored in the program storage area 32A determine the results of events and execute operations based on these results. However, this specification may omit a description of such determinations and may merely describe the operations of each program. Thus, the expression in the following description "the control program executes Process A in response to Condition A" may be used to denote the meaning "the control program determines whether Condition A is met and executes Process A in response to a positive determination."

The OS 34 is the underlying software that provides an application programming interface (API) for controlling the hardware constituting the multifunction peripheral 10, including the printer 11, scanner 12, fax unit 13, display 23, user I/F 24, and network I/F 25. The programs described above control the hardware of the multifunction peripheral 10 by calling the API provided in the OS 34. However, the role of the OS 34 will not be included in a description of operations of these programs in this specification. Thus, the phrase "Program B controls Hardware C" in the following description may be used to signify that "Program B controls Hardware C via the API of the OS 34." This usage in the following description will also apply to the server 50 described later.

The data storage area 32B stores account information, such as that illustrated in FIG. 3A. Account information is information indicating accounts with which users log in to the multifunction peripheral 10. For example, General account information is registered on the multifunction peripheral 10 via the user I/F 24 by an administrator who is logged in to the multifunction peripheral 10 using the administrative account described later. The data storage area 32B may store one or a plurality of records of account information, or may store no account information.

The account information illustrated in FIG. 3A is stored in a nonvolatile area of the data storage area 32B. Of the account information illustrated in FIG. 3A, the user ID and password for the administrative account may also be expressed as the "registered ID information." Administrative account information is not stored in the data storage area 32B when the multifunction peripheral 10 is shipped. An administrator registers administrative account information on the multifunction peripheral 10 via the user I/F 24 while in a non-logged-in state described later. Generally, an administrator registers administrative account information on the multifunction peripheral 10 before general users use the multifunction peripheral 10. The administrative account is an example of a specific account.

As another example, default administrative account information may be stored in the data storage area 32B when the multifunction peripheral 10 is shipped. In this case, the administrator may perform user operations to log in using the default administrative account on the basis of the user manual for the multifunction peripheral 10. Thereafter, the administrator may perform administrative operations described later to change the default administrative account information recorded in the data storage area 32B into administrative account information specific to the administrator.

Account information includes a user ID, a password, and an account type. The user ID and password are information used in order to compare with the user ID and password received from the user during a login accepting process described later. The account type is information indicating the authorization of the account identified by the combination of the user ID and password. More specifically, the account type is information that identifies what operations the multifunction peripheral 10 allows the user, who is logged in using the corresponding user ID and password, to perform. The concept of "allowing operations" will be described later in greater detail.

For example, the account type "Admin" denotes the authorization assigned to the administrator of the multifunction peripheral 10. Administrative operations, general operations, and basic operations are allowed to users who logs in to using accounts having the account type "Admin." The account type "User" denotes the authorization granted to general users of the multifunction peripheral 10 who are not administrators. General operations and basic operations are allowed to users who logs in using accounts having the account type "User," but administrative operations are not allowed, that is, administrative operations are rejected. Account information including the account type "Admin" is an example of the special account information denoting a special account and is an example of the administrative account information specifying an administrative account. Account information including the account type "User" is an example of general account information indicating a general account.

Note that when general account information is stored in the data storage area 32B and administrative account information is not stored in the data storage area 32B, the multifunction peripheral 10 may allow general users to perform general operations and administrative operations. Further, if neither administrative account information nor general account information is stored in the data storage area 32B, the multifunction peripheral 10 may allow guest users to perform general operations and administrative operations.

Administrative operations include operations for modifying important settings on the multifunction peripheral 10 (settings that have the potential to relax security or lead to information leaks, for example) or operations for browsing important information stored on the multifunction peripheral 10 (confidential business information, for example). Examples of these administrative operations are an operation instructing the printer 11 or display 23 to output an administrative report providing records of operations on the multifunction peripheral 10, an operation to record new general account information in the data storage area 32B, an operation to modify account information recorded in the data storage area 32B, an operation to select general operations that are allowed to general accounts, an operation to delete account information stored in the data storage area 32B, an operation to modify important settings for the multifunction peripheral 10, and an operation to restore the multifunction peripheral 10 to its initial factory settings.

General operations are operations that have less importance than administrative operations and include operations that modify settings for enhancing the user-friendliness of the multifunction peripheral 10, for example. Examples of general operations are an operation to display shortcut icons in a menu screen, an operation to change the default resolution of an image to be recorded by the printer 11, an operation to record a destination fax number in the multifunction peripheral 10, and an operation to specify the preferred paper tray to be used in recording operations on the printer 11 when the multifunction peripheral 10 has a plurality of trays accommodating sheets of different sizes.

Basic operations are operations that use basic functions of the multifunction peripheral 10. Examples of basic operations are an operation instructing the printer 11 to execute a recording process, an operation instructing the scanner 12 to execute a scanning process, an operation instructing the fax unit 13 to execute a fax process, and an operation instructing the printer 11 and scanner 12 to execute a copying process. Basic operations are allowed to all users including guest users. Thus, users can execute basic operations even in the non-logged-in state described later.

Here, an "operation" denotes an action performed on the multifunction peripheral 10 by a user in order to instruct the multifunction peripheral 10 to perform a corresponding process (a machine operation). An example of an operation is an action performed on the user I/F 24 in order to instruct the multifunction peripheral 10 to perform a corresponding process. Further, the term "process" indicates an action performed by the multifunction peripheral 10 in response to the corresponding user operation. Examples of processes are the recording process, scanning process, fax process, and copying process described above.

Hence, the concept of "the multifunction peripheral 10 allowing a user to perform an operation" in this specification is the action of the multifunction peripheral 10 set itself to be able to execute a process (a machine operation) corresponding to a user operation. For example, the multifunction peripheral 10 may store a consent flag in the data storage area 32B. The consent flag indicates that the multifunction peripheral 10 is to execute a process corresponding to an icon instructing the execution of the process in response to the icon being selected. Further, the multifunction peripheral 10 may display the icon corresponding to an instruction to execute the process on the display 23. The process executed by the multifunction peripheral 10 in correspondence to the administrative operation is an example of specific machine operations for an administrator.

On the other hand, the expression "the multifunction peripheral 10 does not allow the user to perform an operation" indicates the action of the multifunction peripheral 10 set itself not to execute a process (a machine operation) corresponding to a user operation. For example, the multifunction peripheral 10 may set itself not to display an icon corresponding to an instruction to execute the process on the display 23. Further, the multifunction peripheral 10 may delete the consent flag from the data storage area 32B.

Further, the status of the multifunction peripheral 10 can change between a logged-in state and a non-logged-in state. The multifunction peripheral 10 executes a login accepting process described later and enters the logged-in state when the user logs into the multifunction peripheral 10 with an administrative account or a general account. The multifunction peripheral 10 may also execute a logout process described later and enters the non-logged-in state when the logout process is executed or when the user I/F 24 has remained idle in the logged-in state for a threshold period. The threshold period may be set to any period from approximately 10 seconds to 10 minutes, for example.

When in the logged-in state, the multifunction peripheral 10 allows the login user to perform operations identified by the account type of the login account. In other words, the multifunction peripheral 10 (the control program 35) determines what type of machine operation is permitted for the logged user on the basis of the login account. When in the non-logged-in state, the multifunction peripheral 10 allows only basic operations. Here, the "login account" denotes the account identified by the combination of the user ID and password inputted during the login accepting process. The login user denotes the user to whom the login account for the multifunction peripheral 10 is assigned. A "guest user" denotes a user to whom the login account has not been assigned.

As illustrated in FIG. 3B, the data storage area 32B can also store contact information. Contact information specifies the destination for sending notifications of status information indicating the states of output units. The contact information may be the e-mail address of the administrator of the multifunction peripheral 10, for example. The administrator registers the contact information via the user I/F 24 when logged into using the administrative account. Contact information need not be stored in the data storage area 32B. The contact information illustrated in FIG. 3B is stored in a nonvolatile area of the data storage area 32B.

The multifunction peripheral 10 can transmit reports to the e-mail address registered as the contact information, for example. Reports sent by e-mail notify the administrator of the states of output units. While there is no particular restriction on the details of such reports, the reports may include status information including the number of images that the printer 11 has recorded within a prescribed interval and the usage or remaining quantities of ink or toner, for example. The multifunction peripheral 10 may be provided with a function for serving as its own e-mail client or may issue requests to another device possessing an e-mail client function (the server 50 on the Internet 101, for example) to transmit reports by e-mail.

<Server 50>

Figure 2B:
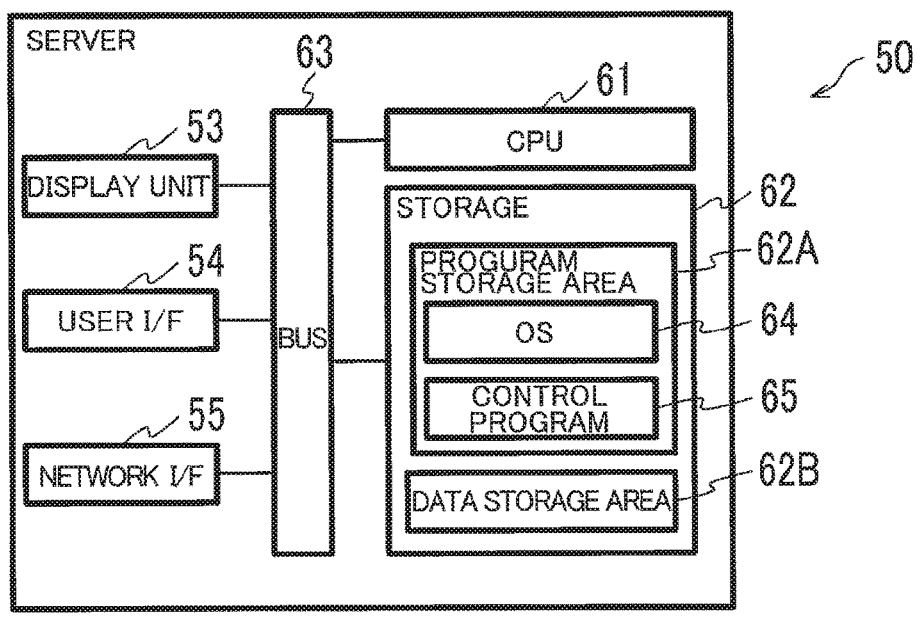
FIG. 2B is a block diagram illustrating an electrical configuration of a server according to the first embodiment.

As illustrated in FIG. 2B, the server 50 includes a display 53, an user I/F 54, a network I/F 55, a CPU 61, and a storage 62, all of which components are connected via a communication bus 63. The storage 62 has a program storage area 62A, and a data storage area 62B. The program storage area 62A stores an OS 64, and a control program 65. Since the display 53, user I/F 54, network I/F 55, CPU 61, storage 62, and communication bus 63 of the server 50 share the same characteristics as the display 23, user I/F 24, network I/F 25, CPU 31, storage 32, and communication bus 33 of the multifunction peripheral 10 a description of these components will not be repeated. The CPU 61 and storage 62 are an example of the controller.

As illustrated in FIG. 4A, the data storage area 62B can store printer IDs, and notification data associated with each printer ID. The printer ID is an example of the ID information for identifying the multifunction peripherals 10A and 10B. In the first embodiment, "MFP-A" is used as the printer ID for the multifunction peripheral 10A, and "MFP-B" is used as the printer ID for the multifunction peripheral 10B. The notification data specifies notifications to be notified to the user of the multifunction peripheral 10 identified by the corresponding printer ID. More specifically, the notification data represents an notification image to be recorded on a sheet by the printer 11 and/or to be displayed on the display 23.

The details of the notification image may be a description of new functions that can be added to the multifunction peripheral 10, a description of new functions added to the server 50, a coupon discounting the purchase price of products or services (hereinafter simply referred to as "products, etc.") related to the multifunction peripheral 10, or a query as to whether to permit the multifunction peripheral 10 to transmit device data collected by the multifunction peripheral 10 to the server 50 in order for the server 50 to issue the coupon. Products related to the multifunction peripheral 10 may be consumables that can be detachably mounted in the multifunction peripheral 10 (ink, toner, drums, and recommended paper, for example), high-end models compatible with the multifunction peripheral 10, or accessories related to using the multifunction peripheral 10, for example. Services related to the multifunction peripheral 10 may include extending the warranty period or paid support, for example.

The administrator of the server 50 generates this notification data on the basis of the device data collected from the multifunction peripheral 10 and records the notification data in the server 50 in association with the printer ID of the multifunction peripheral 10, for example. Notification data may be transmitted only to multifunction peripherals 10 which are installed in predetermined regions (hereinafter called "target regions") and whose model is predetermined model (hereinafter called a "target model"), for example. Therefore, notification data is sent only to multifunction peripherals 10 whose administrators have allowed the collection of device data.

As illustrated in FIG. 4B, the data storage area 62B may also store printer IDs, and consent flags associated with the printer IDs. Each consent flag may be set to "permission granted" indicating the administrator of the multifunction peripheral 10 identified by the printer ID has already granted permission to transmit device data, or "permission not granted" indicating that the administrator has not yet granted permission. The consent flags are initially set to the value "permission not granted." The consent flag is set to the value "permission granted" when permission to transmit device data is granted in a consent confirming process. The consent confirming process is performed by collaboration of the multifunction peripheral 10A and server 50 in order to confirm whether the administrator of the multifunction peripheral 10 consents to the collection and transmission of device data. This process will be described later in greater detail.

<Operations of the Recording System 100>

Next, the operations of the recording system 100 according to the first embodiment will be described with reference to FIGS. 5 through 11. The recording system 100 executes a process in which the server 50 transmits notification data to the multifunction peripheral 10A, and the multifunction peripheral 10A outputs a notification image represented by the notification data at a suitable timing and according to a suitable method. This process is similarly executed between the multifunction peripheral 10B and the server 50.

In S11 of FIG. 5, the control program 35 of the multifunction peripheral 10A transmits query information to the server 50 via the network I/F 25. Query information includes the printer ID "MFP-A" identifying the multifunction peripheral 10A, and model information indicating the model of the multifunction peripheral 10A. Query information serves to query the server 50 regarding the existence of notification data corresponding to the printer ID. In other words, the query information serves as a request to the server 50 to transmit query data associated with the printer ID. The control program 35 of the multifunction peripheral 10A repeatedly transmits the query information automatically at an arbitrary timing. The process performed by the multifunction peripheral 10A to transmit query information is an example of the query process or the transmission process in the disclosure. Note that the control program 35 may transmit query information to the server 50 via the network I/F 25 when a user operation on a query icon associated with the transmission of query information is received in an operation accepting process described later. The query icon will be described later in greater detail.

Also in S11 the control program 65 of the server 50 receives the query information from the multifunction peripheral 10A via the network I/F 55. The process performed by the server 50 to receive query information is an example of the query receiving process in the disclosure. In S12 the control program 65 determines whether the multifunction peripheral 10A is the target model and whether the multifunction peripheral 10A is located in the target region.

For example, the control program 65 may determine that the multifunction peripheral 10A is the target model when the model of the multifunction peripheral 10A indicated by the model information included in the query information belongs to a list of target models registered in the data storage area 62B. Similarly, the control program 65 may determine that the multifunction peripheral 10A is located in the target region when the global IP address set in the source address (SA) of the IP packet that includes the query information falls within a range of global IP addresses for target regions recorded in the data storage area 62B.

When at least one of the conditions, 1) the multifunction peripheral 10A is not the target model and 2) the multifunction peripheral 10A is not installed in the target region, is satisfied (S12: NO), in S13 the control program 65 transmits error information to the multifunction peripheral 10A via the network I/F 55. Error information indicates that the multifunction peripheral 10A is not a transmission target for notification data. Also in S13 the control program 35 of the multifunction peripheral 10A receives the error information from the server 50 via the network I/F 25. Note that, while not illustrated in the drawings, the control program 35 may display the content of the error information received from the server 50 on the display 23 when query information was transmitted in response to receipt of a user operation instructing the transmission of such query information.

However, when the control program 65 determines that the multifunction peripheral 10A is the target model and the multifunction peripheral 10A is located in the target region (S12: YES), in S14 the control program 65 determines whether the value of the consent flag stored in the data storage area 62B in association with the printer ID included in the query information is "permission granted" or "permission not granted." When the control program 65 determines that either the consent flag associated with the printer ID "MFP-A" has been set to "permission not granted" or when the printer ID "MFP-A" is not registered in the data storage area 62B illustrated in FIG. 4B (S14: NO), in S15 the control program 65 transmits notification message information to the multifunction peripheral 10A via the network I/F 55. Notification message information is information for displaying a menu screen on the multifunction peripheral 10 that includes a notification message described later.

Figure 8A:
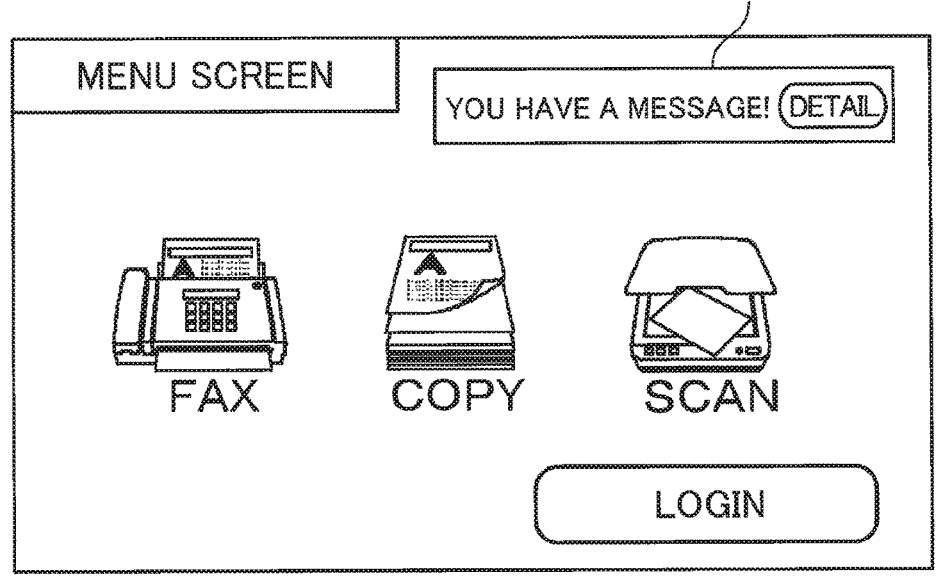
FIG. 8A is an explanatory diagram illustrating a menu screen displayed on the display.

Also in S15 the control program 35 of the multifunction peripheral 10A receives the notification message information from the server 50 via the network I/F 25. In S16 the control program 35 displays the notification message on the display 23. FIG. 8A shows an example of menu screen that includes the notification message. The menu screen illustrated in FIG. 8A includes a "FAX" icon, a "COPY" icon, a "SCAN" icon, a "LOGIN" icon, and a message display region 111. The message display region 111 illustrated in FIG. 8A includes the notification message "You have a message!" and a "Detail" icon.

Next, the control program 35 receives a user operation via the user I/F 24 of tapping the user I/F 24 at a position corresponding to an icon in the menu screen. In S17 when the control program 35 determines that the tapped position corresponds to the "View" icon, in S18 the control program 35 transmits detail request information to the server 50 via the network I/F 25. Detail request information is information requesting the server 50 to execute the consent confirming process.

While not illustrated in the drawings, the control program 35 controls the fax unit 13 to execute a fax process in response to a tap at the position of the "FAX" icon, controls the printer 11 and scanner 12 to perform a copy process in response to a tap at the position of the "COPY" icon, and controls the scanner 12 to execute a scanning process in response to a tap at the position of the "SCAN" icon. The control program 35 also executes a login accepting process described later in response to a tap at the position of the "LOGIN" icon.

Note that the "LOGIN" icon may be included in the menu screen only when the multifunction peripheral 10A is in the non-logged-in state. A "LOGOUT" icon may be displayed in place of the "LOGIN" icon on the menu screen when the multifunction peripheral 10A is in the logged-in state. The control program 35 may switch the state of the multifunction peripheral 10A from the logged-in state to the non-logged-in state in response to a tap at the position of the "LOGOUT" icon. This process is an example of the logout process.

Also in S18 the control program 65 of the server 50 receives the detail request information from the multifunction peripheral 10A via the network I/F 55. In S19 the control program 65 transmits consent confirmation information to the multifunction peripheral 10A via the network I/F 55. Consent confirmation information is information instructing the multifunction peripheral 10A to execute the consent confirming process. In other words, the consent confirmation information is an example of notification data for querying the administrator of the multifunction peripheral 10A whether to permit the transmission of device data collected by the multifunction peripheral 10A in order to transmit notification data.

Also in S19 the control program 35 of the multifunction peripheral 10A receives the consent confirmation information from the server 50 via the network I/F 25. The process performed by the multifunction peripheral 10A to receive consent confirmation information is an example of the notification receiving process. In S20 the control program 35 executes an output controlling process in response to receipt of the consent confirmation information. The output controlling process is a process in which the control program 35 outputs the notification image specified by the notification data received from the server 50 at a suitable timing and according to a suitable method. This output controlling process will be described next with reference to FIG. 6.

Figure 6:
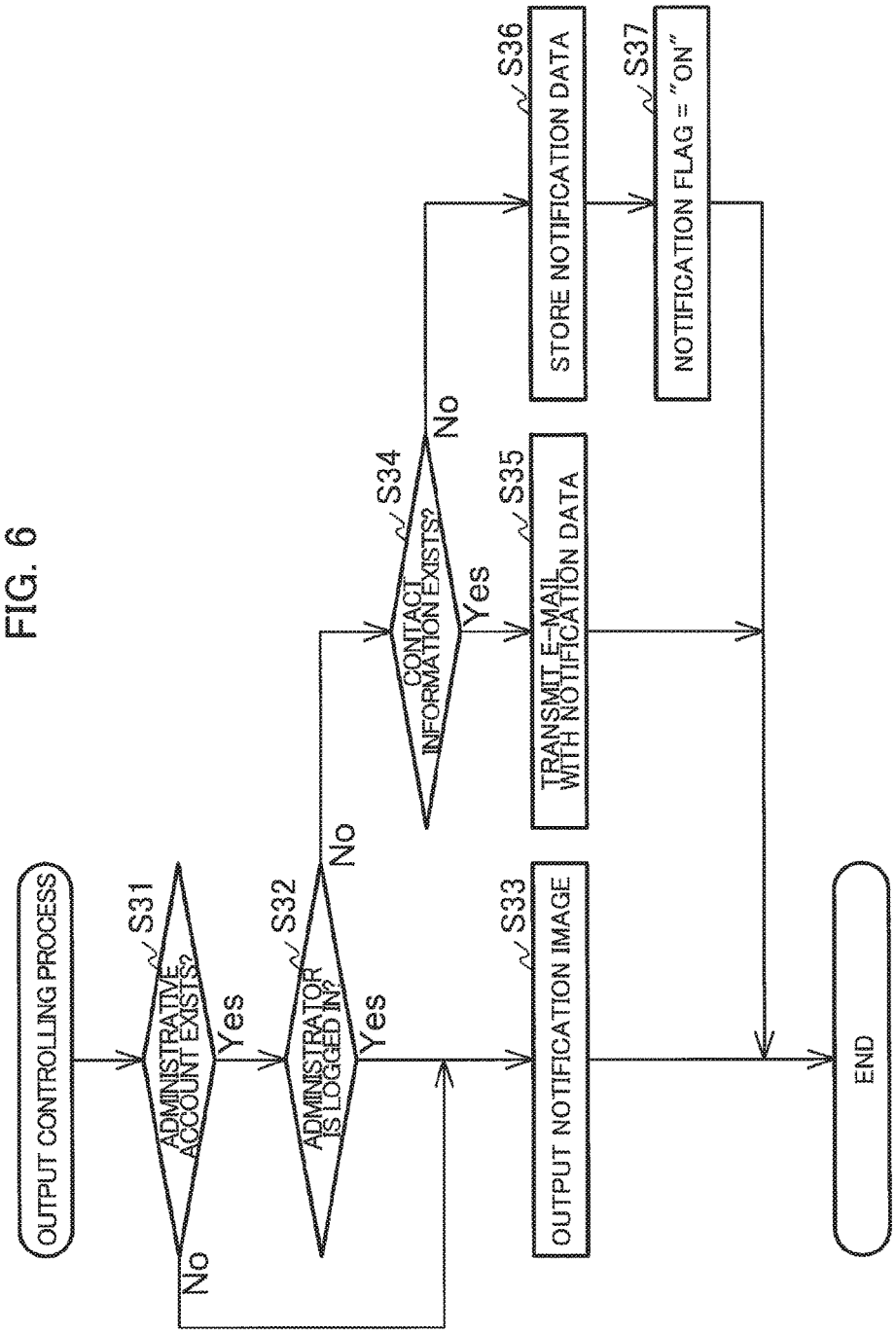
FIG. 6 is a flowchart illustrating an output controlling process according to the first embodiment.

In S31 of FIG. 6, the control program 35 determines whether an administrative account is registered in the data storage area 32B illustrated in FIG. 3A. The control program 35 determines that an administrative account is registered when account information including the account type "Admin" is stored in the data storage area 32B (S31: YES). The control program 35 determines that an administrative account is not registered when account information including the account type "Admin" is not stored in the data storage area 32B (S31: NO). The process in S31 is an example of the preliminary determining process.

Note that when default administrative account information is stored in the data storage area 32B of the multifunction peripheral 10 at the time of shipping, the control program 35 may determine in S31 whether the administrative account recorded in the data storage area 32B has changed from the default administrative account information. That is, the control program 35 may compare the administrative account recorded in the data storage area 32B with the default administrative account information and determine whether the accounts match (a YES determination if they do no match and a NO determination if they match). Alternatively, the control program 35 may be configured to store a modification flag in the data storage area 32B when the administrative account recorded in the data storage area 32B has been modified. In this case, the control program 35 reaches a YES determination in S31 when a modification flag has been stored and a NO determination when a modification flag has not been stored.

When the control program 35 determines that an administrative account is registered (S31: YES), in S32 the control program 35 determines whether the user of the multifunction peripheral 10 is logged in using the administrative account. In other words, in S32, the control program 35 determines whether the user of the multifunction peripheral 10 is logged in to the administrative account. Specifically, the control program 35 references the registered ID information illustrated in FIG. 3A and determines whether the account type associated with the inputted ID Information is "Admin". The inputted ID information denotes the user ID and password that were stored temporarily in the data storage area 32B during the login accepting process of S45 or S50 described later. Details of the inputted ID information will be described later in greater detail. The process of S32 is an example of the first determining process in the disclosure. The administrator is an example of an authorized user.

When the multifunction peripheral 10A is in the logged-in state and the account type of the login account is "Admin" (S32: YES), the control program 35 determines that the user is logged in using the administrative account, that is, the control program 35 determines that the user is logged in to the administrative account. When either 1) the multifunction peripheral 10A is not in the logged-in state or 2) the multifunction peripheral 10A is in the logged-in state and the account type of the login account is not "Admin" (S32: NO), the control program 35 determines that the user is not logged in using the administrative account, that is, the control program 35 determines that the user is not logged in to the administrative account.

When the control program 35 determines that the user is logged in with the administrative account (S32: YES), in S33 the control program 35 controls an output unit to output the notification image indicated by the received notification data. The control program 35 also executes the process of S33 when determining in S31 that an administrative account is not registered (S31: NO). The process of S33 is an example of the notification outputting process.

However, when the control program 35 determines that the user is not logged in with an administrative account (S32: NO), the control program 35 determines in S34 whether contact information has been recorded. In other words, the control program 35 determines that contact information has been registered when contact information is stored in the data storage area 32B illustrated in FIG. 3B (S34: YES) and determines that contact information has not been registered when contact information is not stored in the data storage area 32B (S34: NO). The process of S34 is an example of the second determining process.

When the control program 35 determines that contact information has been registered (S34: YES), in S35 the control program 35 transmits an e-mail with the attached notification data to the e-mail address indicated by the contact information. Alternatively, the control program 35 may transmit an e-mail describing the content of the notification data in its body. The specific process for transmitting e-mail is similar to the process for sending reports by e-mail. The process of S35 is an example of the notification transmitting process.

However, when the control program 35 determines that contact information has not been registered (S34: NO), in S36 the control program 35 stores the received notification data in the data storage area 32B. The process in S36 is an example of the storage controlling process. In S37 the control program 35 sets a notification flag to ON. The notification flag indicates whether notification data has been stored in the data storage area 32B. The notification flag is set to ON, indicating that notification data has been stored, or OFF, indicating that notification data has not been stored. The notification flag is initialized to the value OFF. Further, the notification flag is set to ON when the storage controlling process of S36 has been executed, and is set to OFF when the notification outputting process described later in S47 has been executed.

Figure 8B:
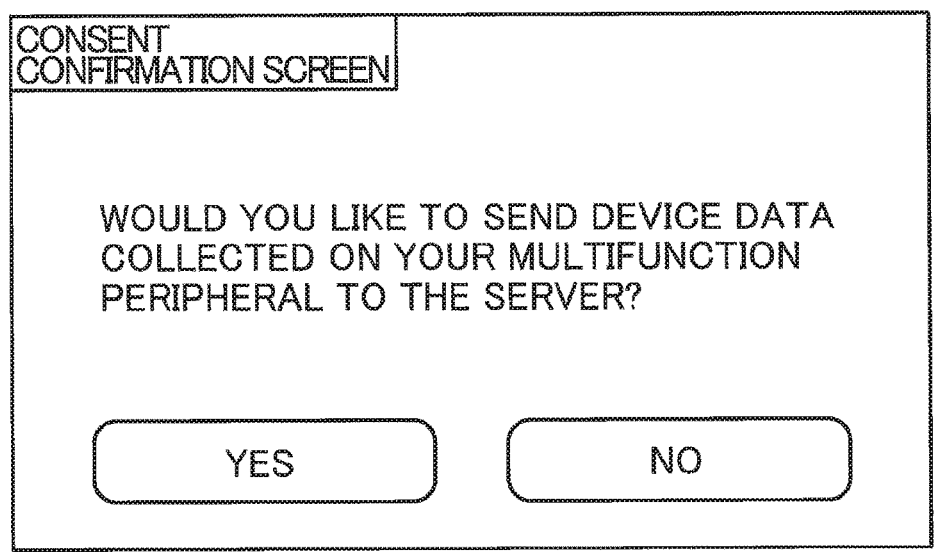
FIG. 8B is an explanatory diagram illustrating a consent confirmation screen displayed on the display.

Note that the control program 35 displays a consent confirmation screen on the display 23 in the notification outputting process performed on the consent confirmation information. FIG. 8B shows an example of the consent confirmation screen. The consent confirmation screen in FIG. 8B includes the message "Would you like to send device data collected on your multifunction peripheral to the server?" and the icons "YES" and "NO." The control program 35 receives a user operation via the user I/F 24 when the user taps on a position of one of the icons in the consent confirmation screen.

Further, in the notification outputting process performed on the consent confirmation information, the control program 35 needs to receive a selection for one of the icons "YES" and "NO." Therefore, in the notification transmitting process for the consent confirmation information, the control program 35 may transmit e-mail to the administrator's contact information in order to notify the administrator that consent confirmation information was received, as well as executing steps S36 and S37 described above. In this way, the administrator can be prompted to log in with the administrative account upon viewing the e-mail. The process performed when the administrator logs in with the administrative account after notification data was stored in the data storage area 32B will be described later.

Returning to FIG. 5, when the user taps on the display 23 at a position corresponding to the "YES" icon in the consent confirmation screen in S21, in S22 the control program 35 transmits consent information to the server 50 via the network I/F 25. Consent information specifies that the administrator of the multifunction peripheral 10A has permitted the collection of device data. The consent information also includes the printer ID "MFP-A" of the multifunction peripheral 10A.

Also in S22 the control program 65 of the server 50 receives the consent information from the multifunction peripheral 10A via the network I/F 55. In response to receipt of the consent information, In S23 the control program 65 stores the printer ID "MFP-A" included in the received consent information and the consent flag "permission granted" in the data storage area 62B illustrated in FIG. 4B. Further, when the printer ID "MFP-A" has already been recorded in the data storage area 62B illustrated in FIG. 4B, the control program 65 sets the consent flag corresponding to the printer ID "MFP-A" to "permission granted." In S24 the control program 65 transmits active information to the multifunction peripheral 10A via the network I/F 55. Active information is information for activating the device data collecting function in the multifunction peripheral 10A.

Also in S24 the control program 35 receives the active information from the server 50 via the network I/F 25. In S25 the control program 35 activates the device data collecting function of the multifunction peripheral 10A. Specifically, the control program 35 stores an active flag in the data storage area 32B. The active flag indicates that the device data collecting function is active. When the active flag has been stored in the data storage area 32B, the control program 35 begins collecting the device data designated by the server 50 and transmits the collected device data to the server 50 via the network I/F 25 at the timing designated by the server 50.

The control program 65 of the server 50 also transmits related data to the multifunction peripheral 10A via the network I/F 55. The related data indicate at least one of 1) the type of device data to be collected and 2) the timing for transmitting the device data. For example, the type of device data may include the number of images recorded by the printer 11, the quantity of ink or toner consumed, and the quantity of ink or toner remaining. The transmission timing for device data may be the timing at which the server 50 transmits device data request information, or may be prescribed intervals designated by the server 50. The control program 65 receives the device data from the multifunction peripheral 10A via the network I/F 55. Upon receiving device data, the control program 65 stores the data in the data storage area 62B and outputs the device data in response to a request by the administrator of the server 50.

The related information transmitted from the server 50 is correlated with active information. For example, related information may be included in the active information or may be transmitted from the server 50 in series with the active information. Alternatively, the related information and active information may include the same ID.

Although not illustrated in FIG. 5, when the user of the multifunction peripheral 10A taps on the display 23 at a position corresponding to the "NO" icon in the consent confirmation screen, the control program 35 of the multifunction peripheral 10A transmits non-consent information to the server 50 via the network I/F 25. Non-consent information indicates that the administrator of the multifunction peripheral 10A does not permit the collection of device data. The control program 65 of the server 50 receives this non-consent information from the multifunction peripheral 10A via the network I/F 55. The control program 65 stores the printer ID "MFP-A" of the multifunction peripheral 10A and the consent flag "permission not granted" in the data storage area 62B illustrated in FIG. 4B.

However, when the control program 65 of the server 50 determines in S14 that the consent flag corresponding to the printer ID "MFP-A" has been already set to "permission granted" (S14: YES), the process described above in steps S15-S25 are skipped. In S26 the control program 65 determines whether notification data associated with the printer ID "MFP-A" has been stored in the data storage area 62B illustrated in FIG. 4A. When notification data associated with the printer ID "MFP-A" has been recorded (S26: YES), in S27 the control program 65 transmits the notification data to the multifunction peripheral 10A via the network I/F 55.

The control program 35 receives this notification data in S27 from the server 50 via the network I/F 25. In S28 the control program 35 executes the output controlling process on the notification data received in S27. The process in step S27 is an example of the notification receiving process. Since the output controlling process of S28 is identical to that in S20, a description of this process will not be repeated. Thereafter, the processes of collecting device data and transmitting notification data are repeatedly performed between the multifunction peripheral 10A and server 50.

Figure 9A:
FIG. 9A is an explanatory diagram illustrating a notification screen with respect to coupon data.

As an example of the notification outputting process for coupon data, the control program 35 displays the notification screen illustrated in FIG. 9A on the display 23. The notification screen in FIG. 9A includes the message "This special coupon has been issued for you. Coupon No.: 1234567", an "OK" icon and a "Print" icon. When the user taps on the display 23 at the position corresponding to the "OK" icon, the control program 35 clears the notification screen from the display. When the user taps on the display 23 at a position corresponding to the "Print" icon, the control program 35 controls the printer 11 to record an image indicating the coupon number "1234567" on a sheet.

The administrator can use the coupon number displayed on the display 23 or recorded on the sheet for purchasing products, etc. related to the multifunction peripheral 10A. Specifically, the administrator may purchase products, etc. at a discounted price by inputting the relevant coupon number at an online shopping website for the products, etc.

Figure 9B:
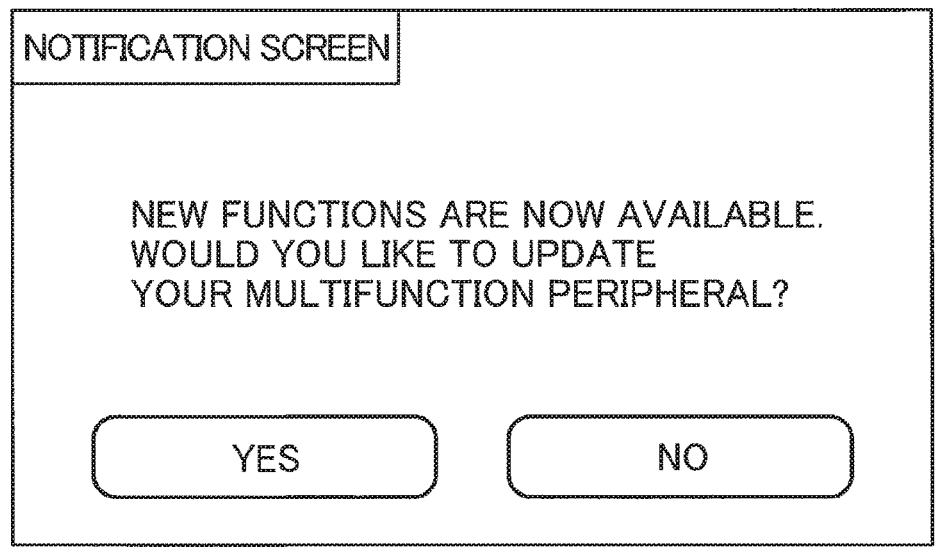
FIG. 9B is an explanatory diagram illustrating the notification screen with respect to update notification data.

As another example of the notification outputting process for update notification data, the control program 35 displays the notification screen illustrated in FIG. 9B on the display 23. The notification screen illustrated in FIG. 9B includes the message "New functions are now available. Would you like to update your multifunction peripheral?", the "YES" icon and the "NO" icon. When the user taps on the display 23 at a position corresponding to the "YES" icon, the control program 35 updates the firmware of the multifunction peripheral 10A or the control program 35 itself. However, When the user taps on the display 23 at a position corresponding to the "NO" icon, the control program 35 clears the notification screen from the display without updating the firmware of the multifunction peripheral 10A or the like.

<Operation Accepting Process>

The control program 35 of the multifunction peripheral 10A also repeatedly executes the operation accepting process illustrated in FIG. 7 while the power to the multifunction peripheral 10A is turned on. Note that the control program 35 can execute this operation accepting process in parallel with the series of processes illustrated in FIG. 5 beginning from the process for transmitting query information in S11. In the operation accepting process, the control program 35 executes processes corresponding to the type of operation when a user performs an operation while a menu screen is displayed. Here, it will be assumed that the multifunction peripheral 10A according to the first embodiment is in the non-logged-in state at the beginning of the operation accepting process.

In S41 of FIG. 7 the control program 35 determines whether the notification flag that was stored in the data storage area 32B in step S37 or S48 is set to ON. The control program 35 displays a menu screen depending on the value of the notification flag on the display 23 in S42 or S43. Specifically, when the notification flag is set to ON (S41: YES), in S42 the control program 35 displays the menu screen illustrated in FIG. 10A on the display 23. However, when the notification flag is set to OFF (S41: NO), in S43 the control program 35 displays the menu screen illustrated in FIG. 10B on the display 23. In S44 the control program 35 accepts user operations via the user I/F 24 in the form of the user tapping the user I/F 24 at the positions of various icons displayed in the menu screen.

Figure 10A:
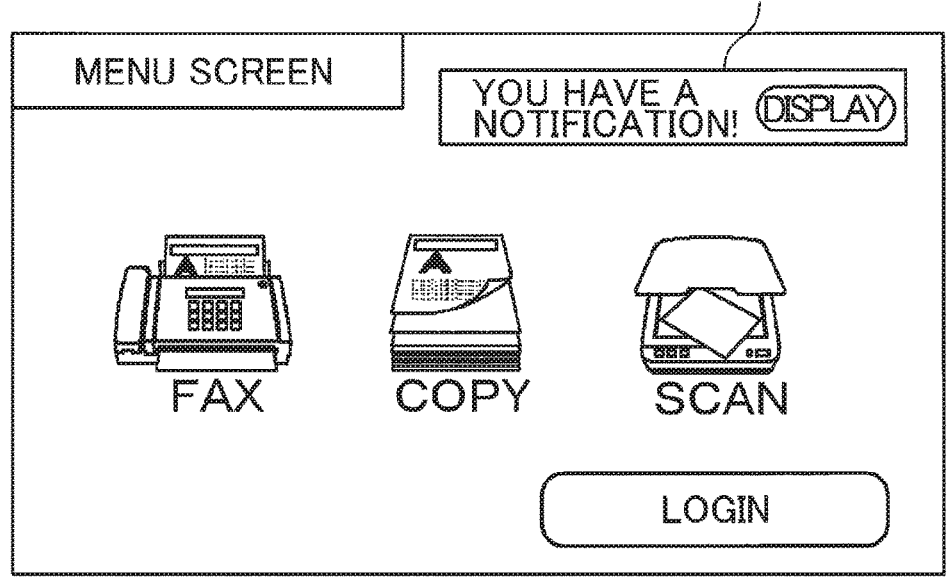
Figure 10B:
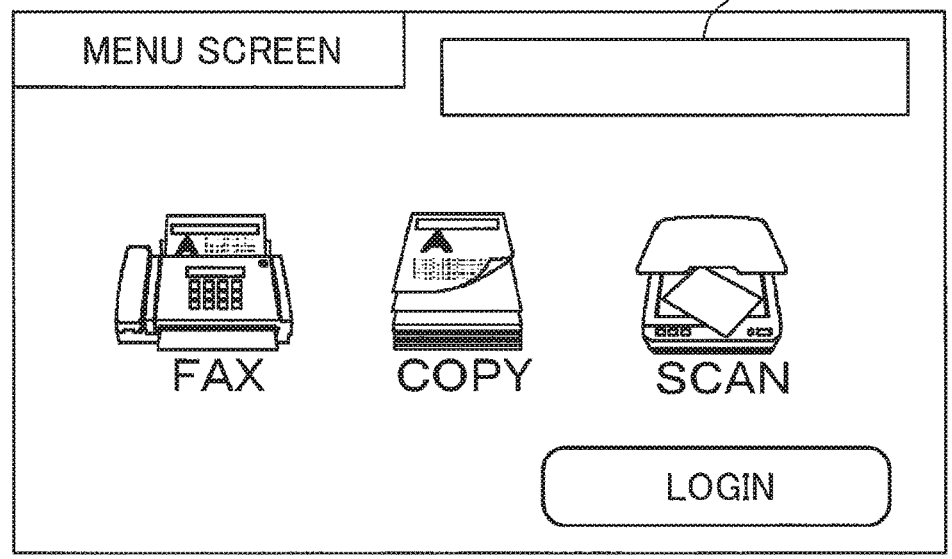
FIG. 10B is an explanatory diagram illustrating the menu screen when the notification flag is set to OFF.

The message display region 111 illustrated in FIG. 10A includes the message "You have a notification!" and a "Display" icon. However, the message display region 111 illustrated in FIG. 10B is blank. The message and the "Display" icon included in the message display region 111 of FIG. 10A is an example of a notification object for notifying the user that notification data exists. The process in step S42 is an example of the notifying process in the disclosure.

In response to user tapping the user I/F 24 at a position corresponding to the "LOGIN" icon (S44: "LOGIN" icon), in S45 the control program 35 executes the login accepting process. The login accepting process is a process in which the control program 35 determines whether a login operation performed by a user is accepted. When the login operation is accepted, the control program 35 changes the status of the multifunction peripheral 10A to the logged-in state. Login operations are operations instructing the multifunction peripheral 10A to log in. While the multifunction peripheral 10A can also accept login for a general account during the login accepting process, the description in this specification will focus on the administrative account.

Figure 11A:
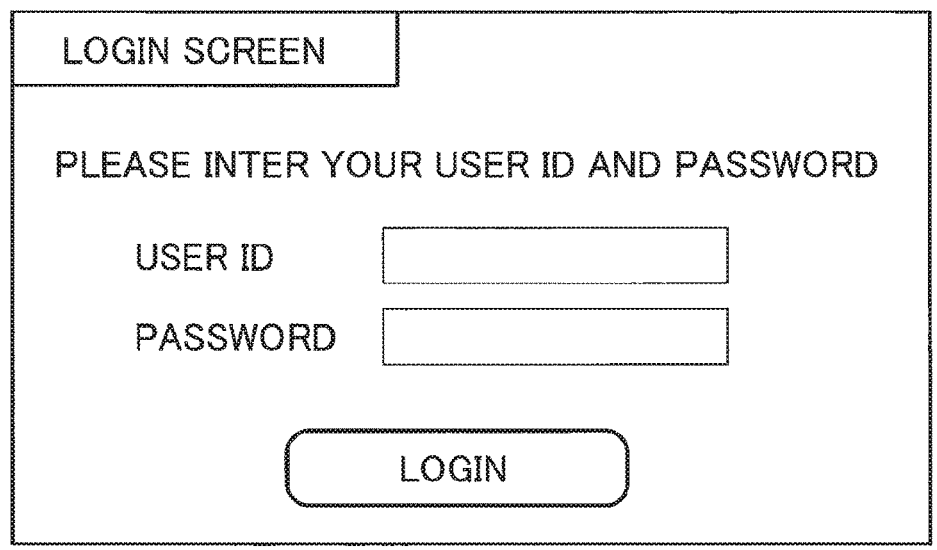
FIG. 11A is an explanatory diagram illustrating a login screen displayed on the display.

In the login accepting process, the control program 35 first displays a login screen on the display 23. FIG. 11A shows an example of the login screen. The login screen illustrated in FIG. 11A includes the message "Please enter your user ID and password," a text box next to the text "User ID" in which the user can input a user ID via the user I/F 24, a text box next to the text "Password" in which the user can input a password via the user I/F 24, and the "LOGIN" icon. The control program 35 receives via the user I/F 24 user operations for inputting both the user ID and password and a user operation for tapping the display 23 at a position corresponding to the "LOGIN" icon.

When the user taps on the display 23 at a position corresponding to the "LOGIN" icon, the control program 35 temporarily stores the user ID and password (hereinafter called the "inputted ID information") received from the user via the user I/F 24, i.e., displayed in the text boxes in the data storage area 32B. The inputted ID information is stored in a volatile area of the data storage area 32B. The control program 35 determines whether the inputted ID information matches registered ID information stored in the data storage area 32B. This process is an example of the account determining process in the disclosure.

When the control program 35 determines that the inputted ID information matches the registered ID information, the control program 35 sets the multifunction peripheral 10 to the logged-in state under the administrative account. The control program 35 also allows administrative operations, general operations, and basic operations to the user. For example, the control program 35 may display icons on the display 23 that only an administrator can select. This process is an example of the authorizing process in the disclosure. However, when the control program 35 determines that the inputted ID information does not match the registered ID information, the control program 35 displays an error screen that includes the message "The user ID or password is incorrect" on the display 23. In this case, the multifunction peripheral 10A remains in the non-logged-in state. Note that when the inputted ID information matches the user ID and password in general account information stored in the data storage area 32B, the control program 35 sets the multifunction peripheral 10A to the logged-in state under a general account.

When the control program 35 has set the multifunction peripheral 10A to a logged-in state under an administrative account through the login accepting process, in S46 the control program 35 determines whether any notification data is stored in the data storage area 32B. When notification data has been stored in the data storage area 32B (S46: YES), in S47 the control program 35 executes the notification outputting process. In S48 the control program 35 deletes this notification data from the data storage area 32B and sets the notification flag to OFF. However, when no notification data is stored in the data storage area 32B (S46: NO), the control program 35 skips steps S47 and S48. The process of S46 is an example of the third determining process. The notification outputting process of S47 is identical to that described in S33. Note that the control program 35 does not execute the processes in S46-S48 after setting the multifunction peripheral 10A to a logged-in state under a general account in the login accepting process.

If the control program 35 determines in S44 that the tapped position corresponds to the "Display" icon in the menu screen illustrated in FIG. 10A (S44: "Display" icon), in S49 the control program 35 displays a login instructing screen on the display 23. The process of receiving a selection for the "Display" icon is an example of the selection receiving process. The process of S49 is an example of the login instructing process for prompting the user to perform a login operation.

Figure 11B:
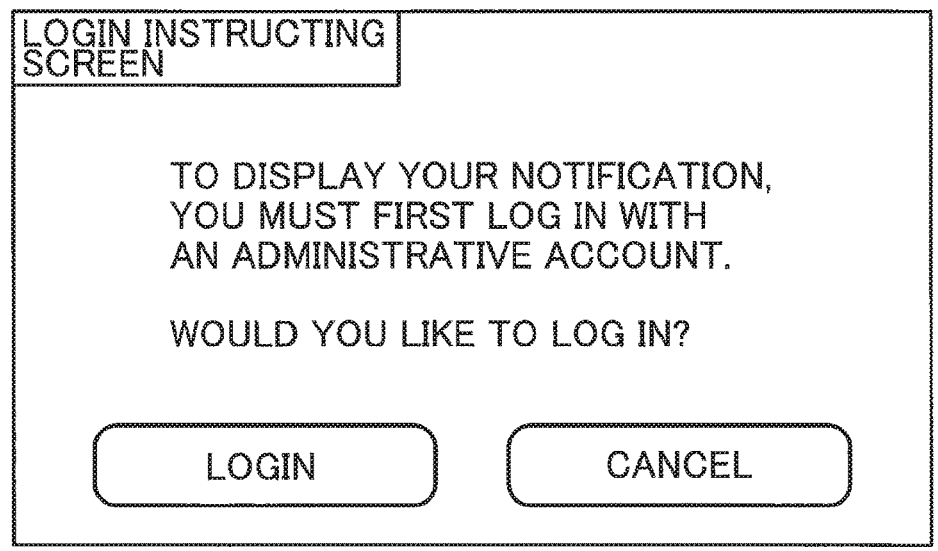
FIG. 11B is an explanatory diagram illustrating a login instructing screen displayed on the display.

FIG. 11B shows an example of the login instructing screen. The login instructing screen illustrated in FIG. 11B includes the message "To display your notification, you must first log in with an administrative account. Would you like to log in?" and a "LOGIN" icon and "Cancel" icon. The control program 35 receives a user operation through the user OF 24 when the user taps on the display 23 at a position corresponding to one of the icons in the login instructing screen.

When the position tapped on the display 23 corresponds to the "LOGIN" icon, in S50 the control program 35 executes the login accepting process. The process in S50 is identical to that described above in S45. When the user has logged in with an administrative account, the control program 35 executes the processes in S47 and S48 described above. Although not illustrated in the flowchart, when the tapped position on the display 23 corresponds to the "Cancel" icon, the control program 35 may again display the menu screen on the display 23 (S42 or S43).

Note that the control program 35 repeats the process described above from step S41 when reaching a NO determination in S46 or after executing the process in S48 or S51. Further, in S43 the control program 35 may display a "Query" icon in the message display region 111 for inquiring about the existence of notification data. When the user taps on the display 23 at a position corresponding to the "Query" icon, the control program 35 may execute the process in S11 described above to query the server 50 for the existence of notification data.

Further, when the control program 35 determines in S44 that the tapped position on the display 23 corresponds to the "FAX" icon, "COPY" icon, or "SCAN" icon in the menu screen (S44: other), in S51 the control program 35 executes a process associated with the respective icon. Step S51 constitutes processes known in the art and will not be described here in detail.

<Operational Advantages of the First Embodiment>

According to the first embodiment described above, a notification image is outputted from an output unit when a user is logged in to the administrative account. When the user is not logged in to the administrative account, on the other hand, the notification data is stored in the data storage area 32B. This notification data stored in the data storage area 32B is outputted at the same time that a user logs in with the administrative account, i.e., when the administrator is near to the multifunction peripheral 10. Note that, in general, a user comes near to the multifunction peripheral 10A, and logs in through the login operation. In this way, the system can output notification data at a suitable timing and according to a suitable method.

Further, by notifying the user that notification data exists in the menu screen, e.g., by presenting an alert indicating the existence of notification data on the menu screen, the administrator can be expected to notice the existence of notification when looking at the menu screen, or another user can be expected to notice the existence of notification and relay this information to the administrator. As a result, the administrator can be quickly notified of the existence of notification. The alert in the message display region 111 may be performed regardless of the status of the multifunction peripheral 10. In other words, the alert may be performed regardless of whether the multifunction peripheral 10 is in a logged-in state or non-logged-in state. Also, the alert may be performed regardless of the account type of the login account with which the user is logged in. Further, the alert may be executed only when a user is logged in with the administrative account.

However, there is a possibility that the multifunction peripheral 10 may be used without registering any account information. In this case, it is highly likely that no account information or notification information has been registered in the multifunction peripheral 10. Therefore, the multifunction peripheral 10 determines in a preliminary determining process according to the first embodiment whether a login function or notification function has been used, thereby preventing circumstances in which notification images cannot be outputted on such a multifunction peripheral 10.

Further, when contact information has been stored on the multifunction peripheral 10 according to the first embodiment, the multifunction peripheral 10 transmits an e-mail with the attached notification data to the e-mail address in the contact information. In this way, the multifunction peripheral 10 can notify an administrator that notification data has been received from the server 50 when the administrator is not near to the multifunction peripheral 10. Further, instead of sending the notification data as an e-mail attachment, the multifunction peripheral 10 may simply transmit e-mail reporting that such notification data has been received to the e-mail address indicated in the contact information. In this way, the multifunction peripheral 10 can prompt the administrator to log in to the multifunction peripheral 10 in order to check the notification data.

Further, the contact information need not be an e-mail address, but may be the IP address of the administrator's terminal on the LAN 102 or 103. In this case, in S35 the control program 35 may transmit notification data or alert information reporting that notification data has been received to a managing application installed on the administrator's terminal. Further, the administrator's terminal indicated in the contact information may be a terminal connected to the Internet. In this case, in S35 the control program 35 may transmit the notification data or alert information to the administrator's terminal via the server 50.

The first embodiment provides an example in which the multifunction peripheral 10 executes the second determining process of S34 after the preliminary determining process of S31 and first determining process of S32. However, the multifunction peripheral 10 may omit the preliminary and first determining processes from the output controlling process and execute only the second determining process. In other words, the control program 35 may execute the second determining process when notification data is received from the server 50 via the network I/F 25. Further, the control program 35 may execute the notification transmitting process of S35 in response to determining that contact information is registered. However, when contact information has not been registered, the control program 35 may execute the notification outputting process of S33.

Further, the first embodiment provides an example of receiving an inputted user ID and password via the user I/F 24 in the login accepting process. However, the specifics of the login accepting process are not restricted to this method. For example, the multifunction peripheral 10 may be provided with a near-field communication (NFC) I/F capable of performing near-field wireless communications. In this case, the control program 35 may prompt the user to position a portable terminal (a card or smartphone, for example) storing the user ID and password near the multifunction peripheral 10 in the login accepting process. In response to receipt of the user ID and password from the portable terminal via the wireless NFC I/F, the control program 35 may compare this information with the registered ID information. The NFC I/F is an example of the receiving unit in the disclosure.

<Second Embodiment>

Next, the operations of the recording system 100 according to a second embodiment will be described with reference to FIGS. 12 and 13. The following description of the recording system 100 will focus on differences from the recording system 100 described in the first embodiment and omit a detailed description of their common points. The recording system 100 according to the second embodiment differs from the recording system 100 in the first embodiment in that the server 50 determines the timing and method of outputting a notification image. A description of the process in S12-S24 of FIG. 5 has been omitted from the second embodiment.

Figure 12:
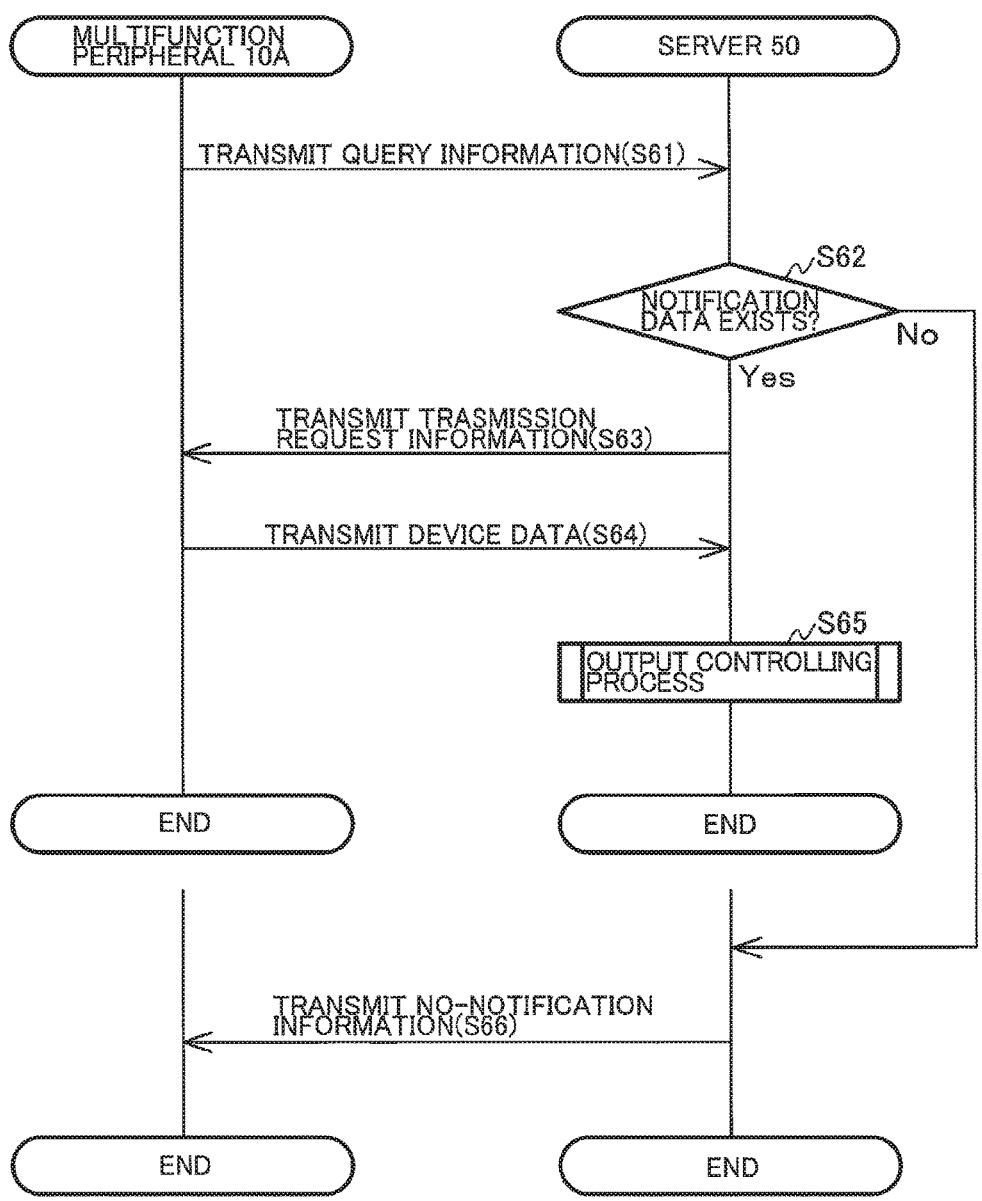
FIG. 12 is a flowchart illustrating processes performed in the recording system according to a second embodiment.

In S61 of FIG. 12, the control program 35 of the multifunction peripheral 10A transmits query information to the server 50 via the network I/F 25. Also in S61, the control program 65 of the server 50 receives the query information from the multifunction peripheral 10A via the network I/F 55. The process of S61 is identical to S11 of FIG. 5.

In S62 the control program 65 determines whether notification data associated with the printer ID "MFP-A" included in the query information is stored in the data storage area 62B illustrated in FIG. 4A. The process of S62 is an example of the first determining process. When notification data associated with the printer ID "MFP-A" is not stored in the data storage area 62B (S62: NO), in S66 the control program 65 transmits no-notification information to the multifunction peripheral 10A via the network I/F 55. The no-notification information indicates that there is no notification data to be transmitted to the multifunction peripheral 10A.

However, when the control program 65 determines in S62 that notification data associated with the printer ID "MFP-A" is stored (S62: YES), in S63 the control program 65 transmits transmission request information to the multifunction peripheral 10A via the network I/F 55. Transmission request information is information instructing the multifunction peripheral 10A to transmit device information. The process of S63 is an example of the requesting process in the disclosure. Also in S63 the control program 35 of the multifunction peripheral 10A receives the transmission request information from the server 50 via the network I/F 25. In S64 the control program 35 transmits the device information to the server 50 via the network I/F 25.

Device information includes some or all of the login information, account list information, and contact information. Login information specifies the account with which the user is currently logged in to the multifunction peripheral 10A. Login information may be the account information for the login account, for example. The account list information is information specifying a list of the accounts registered on the multifunction peripheral 10A. The account list information may list accounts by the account types indicated in FIG. 3A, for example. The contact information is the information indicating the destination for notifications that is registered in the multifunction peripheral 10A. Note that the control program 35 need not include the contact information in the device information when contact information is recorded in the data storage area 32B illustrated in FIG. 3B.

In S64 the control program 65 of the server 50 also receives the device information from the multifunction peripheral 10A via the network I/F 55. In S65 the control program 65 executes the output controlling process on the basis of the device information received in S64. Step S64 is an example of the device information receiving process. The output controlling process according to the second embodiment will be described next in detail with reference to FIG. 13.

Figure 13:
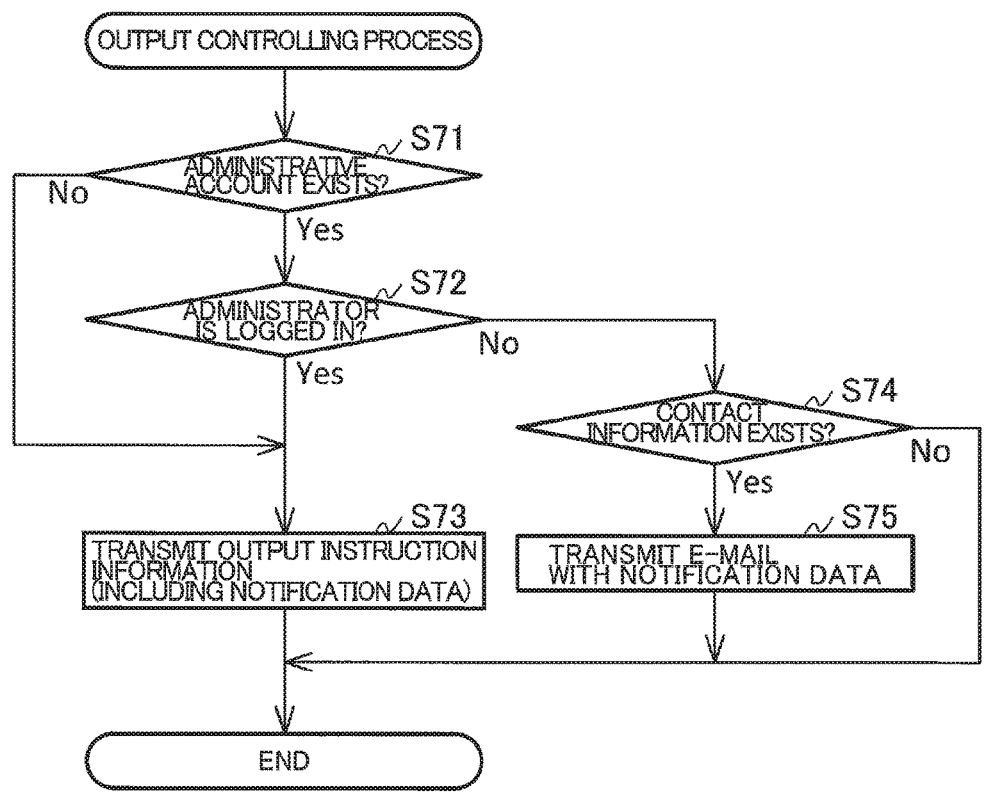
FIG. 13 is a flowchart illustrating an output controlling process according to the second embodiment.

In S71 of FIG. 13, the control program 65 determines whether an administrative account is registered on the multifunction peripheral 10A. Specifically, the control program 65 may determine that an administrative account has been registered on the multifunction peripheral 10A when the account list information in the device information received from the multifunction peripheral 10A includes an account type "Admin" (S71: YES). The control program 65 may determine that an administrative account has not been registered on the multifunction peripheral 10A when the account list information does not include the account type "Admin" (S71: NO). Step S71 is an example of the preliminary determining process.

When an administrative account is registered in the multifunction peripheral 10A (S71: YES), in S72 the control program 65 determines whether the login account on the multifunction peripheral 10A is the administrative account. Specifically, the control program 65 may determine that the login account is an administrative account when the account type in the login information included in the device information received from the multifunction peripheral 10A is "Admin" (S72: YES). The control program 65 may determine that the login account is not an administrative account when the account type in the login information is not "Admin" (S72: NO). The process of step S72 is an example of the second determining process.

When the control program 65 determines that the login account of the multifunction peripheral 10A is the administrative account (S72: YES) or when the control program 65 determines that an administrative account has not been registered in the multifunction peripheral 10A (S71: NO), in S73 the control program 65 transmits output instruction information to the multifunction peripheral 10A via the network OF 55. The output instruction information is information instructing an output unit of the multifunction peripheral 10A to output a notification image specified in the notification data. The output instruction information includes the notification data stored in association with the printer ID "MFP-A" in the data storage area 62B illustrated in FIG. 4A. The control program 65 also deletes the notification data included in the output instruction information from the data storage area 62B. The process of step S73 is an example of the output instructing process.

However, when the control program 65 determines that the login account on the multifunction peripheral 10A is not the administrative account (S72: NO), in S74 the control program 65 determines whether the device information received from the multifunction peripheral 10A includes contact information. When the control program 65 determines that the device information includes contact information (S74: YES), in S75 the control program 65 transmits an e-mail with the notification data attached to the e-mail to the e-mail address specified in the contact information. The control program 65 also deletes the notification data attached to the e-mail from the data storage area 62B. The process of S74 is an example of the third determining process in the disclosure. The process of S75 is an example of the notification transmitting process.

However, when the control program 65 determines in S74 that the device information does not include contact information (S74: NO), the control program 65 does not execute either process in step S73 or S75. In other words, the control program 65 keeps the notification data stored in the data storage area 62B without outputting the notification data at this time. Note that, when the control program 65 determines in S74 that the device information does not include contact information (S74: NO), the control program 65 may execute the process of S73, that is, the control program 65 may transmit output instruction information to the multifunction peripheral 10A via the network OF 55. The control program 65 repeats the output controlling process at the next time query information is received from the multifunction peripheral 10A.

In the second embodiment described above, the control program 65 transmits a notification image to the multifunction peripheral 10 when a user is logged in to an administrative account on the multifunction peripheral 10. The control program 65 waits to transmit notification data when a user is not logged in to an administrative account on the multifunction peripheral 10. In other words, the control program 65 can transmit a notification image to the multifunction peripheral 10 at a timing when the administrator may be near to the multifunction peripheral 10. Further, when contact information is registered in the multifunction peripheral 10, the control program 65 transmits the notification data to the e-mail address in the contact information as an e-mail attachment. Thus, the control program 65 can output notification data at a suitable timing and according to a suitable method.

Processes performed by the controllers of the embodiments described above are achieved by executing corresponding programs stored in the program storage areas 32A and 62A by the respective CPUs 31 and 61 in the multifunction peripherals 10 and the server 80. The configurations of the controllers are not limited to this. That is, at least part of each controller may be achieved by hardware, such as, Integrated Circuit (IC). Further, each controller may include single CPU, a plurality of CPUs, single ASIC, a plurality of ASICs, or an combination of the single CPU or the plurality of CPUs and the single ASIC or the plurality of ASICs.

The embodiments described above pertain to the multifunction peripherals 10 and the server 50, but are not limited to this. Another embodiments may be conceivable as programs causing the multifunction peripherals 10 or the server 50 to performing the processes. In this case, the programs may be stored on a non-transitory computer-readable storage medium. The "non-transitory computer-readable storage medium" may be a portable medium, such as a memory card, CD-ROM, or DVD-ROM. Further, the "non-transitory computer-readable storage medium" may be storages mounted in a server which can access to the multifunction peripheral 10 or the server 50 via the communication network such as the Internet. The programs stored in the storage of the server may be distributed as information or signals indicating the programs via the communication network.

What is claimed is:

1. A server comprising;
   a network interface configured to communicate with an image-outputting apparatus, the image-outputting apparatus being configured to receive user operations including a login operation, the login operation being performed by a user to which an account is assigned, the image-outputting apparatus being configured to determine whether or not the login operation is accepted, the image-outputting apparatus being configured to determine what type of machine operation is permitted for the logged user on the basis of the account used for the accepted login operation, the image-outputting apparatus being configured to transmit query information and device information to the server, the query information being for querying the server whether notification data to be transmitted to the image-outputting apparatus exists, the device information including a login information indicating the account used by the user logged in to the image-outputting apparatus;
   a storage capable of storing the notification data for transmission to the image-outputting apparatus; and
   a controller configured to:
   receive the query information via the network interface;
   in response to receiving the query information, (a) determine whether or not the notification data is stored in the storage;
   in response to determining in (a) that the notification data is stored in the storage, receive the device information via the network interface;
   (b) determine whether or not the login information included in the device information indicates a specific account, the specific account being assigned to an authorized user; and
   in response to determining in (b) that the login information included in the device information indicates the specific account, (c) transmit an output instruction to the image-outputting apparatus via the network interface, the output instruction being for controlling the image-outputting apparatus to output a notification image represented by the notification data.

2. The server according to claim 1, wherein the image-outputting apparatus is capable of including list information in the device information, the list information indicating a list of accounts registered on the image-outputting apparatus, and
   wherein the controller is configured to:
   in response to receiving the device information and prior to determination to be made in (b), (d) determine whether or not the specific account is included in the list information; and
   in response to determining in (d) that the specific account is included in the list information, perform determination of (b).

3. The server according to claim 2, wherein the controller is further configured to, in response to determining in (d)

that the specific account is not included in the list information, perform transmission of (c).

4. The server according to claim 2, wherein the image-outputting apparatus is capable of including a contact information in the device information when the contact information is registered on the image-outputting apparatus, the contact information indicating a notification destination to which information about a state of the image-outputting apparatus is transmitted, and wherein the controller is further configured to:
in response to determining in (b) that the login information included in the device information does not indicate the specific account, (e) determine whether or not the contact information is included in the device information; and
in response to determining in (e) that the contact information is included in the device information, transmit the notification data to the notification destination via the network interface.

5. A server comprising:
a network interface configured to communicate with an image-outputting apparatus, the image-outputting apparatus comprising a output unit configured to output images, the image-outputting apparatus being configured to transmit query information and contact information to the server, the query information being for querying the server whether notification data to be transmitted to the image-outputting apparatus exists, the contact information indicating a notification destination to which information about a state of the output unit is transmitted;
a storage capable of storing notification data; and
a controller configured to:
receive the query information from the image-outputting apparatus via the network interface;
in response to receiving the query information, (a) determine whether or not the notification data is stored in the storage;
in response to determining in (a) that the notification data is stored in the storage, transmit transmission request information to the image-outputting apparatus via the network interface, the transmission request information being for requesting the image-outputting apparatus for transmitting the contact information;
when the contact information is received from the image-outputting apparatus via the network interface, transmit the notification data to the notification destination via the network interface; and
when the contact information is not received from the image-outputting apparatus via the network interface, transmit an output instruction to the image-outputting apparatus via the network interface, the output instruction being for controlling the output unit to output a notification image represented by the notification data.

* * * * *